A. S. KROTZ.
CULTIVATOR OR OTHER VEHICLE HAVING MANUALLY CONTROLLED STEERING WHEELS.
APPLICATION FILED MAY 31, 1913.
1,162,077.
Patented Nov. 30, 1915.
2 SHEETS—SHEET 1.
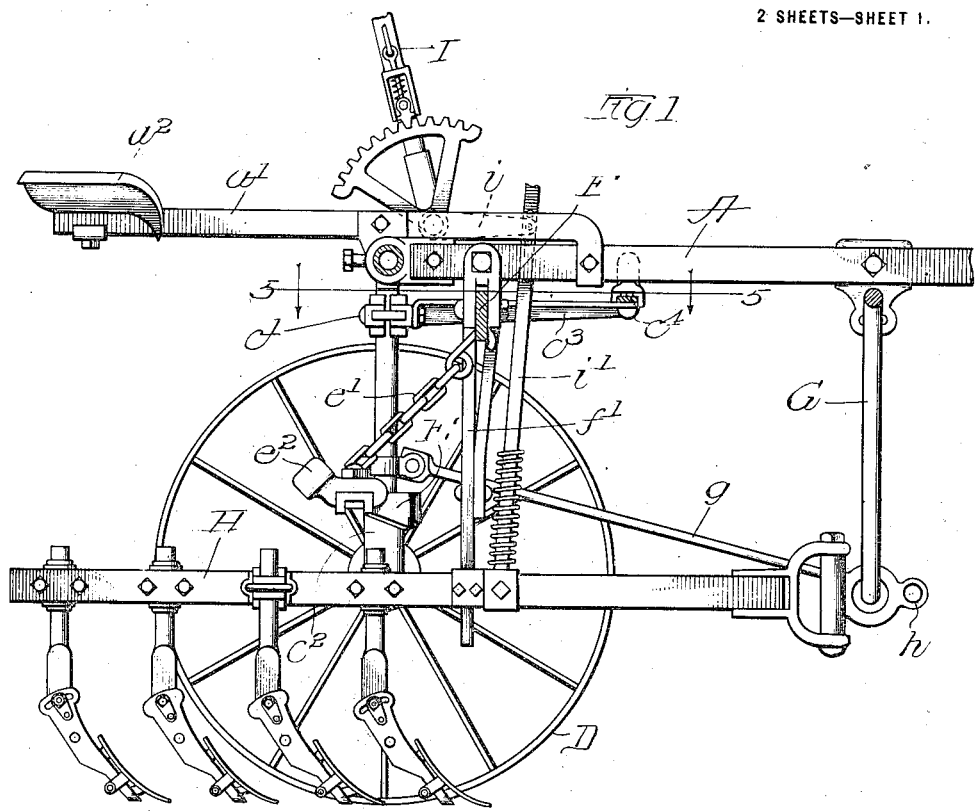
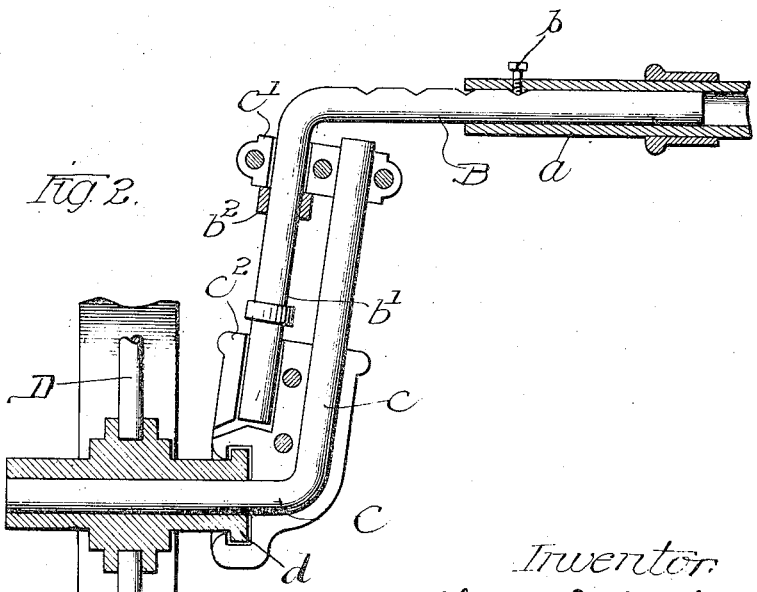
Witnesses:
Inventor:
Alvaro S. Krotz
By Arthur F. Durand
Attorney A. S. KROTZ.
CULTIVATOR OR OTHER VEHICLE HAVING MANUALLY CONTROLLED STEERING WHEELS.
APPLICATION FILED MAY 31, 1913.
1,162,077.
Patented Nov. 30, 1915.
2 SHEETS—SHEET 2.
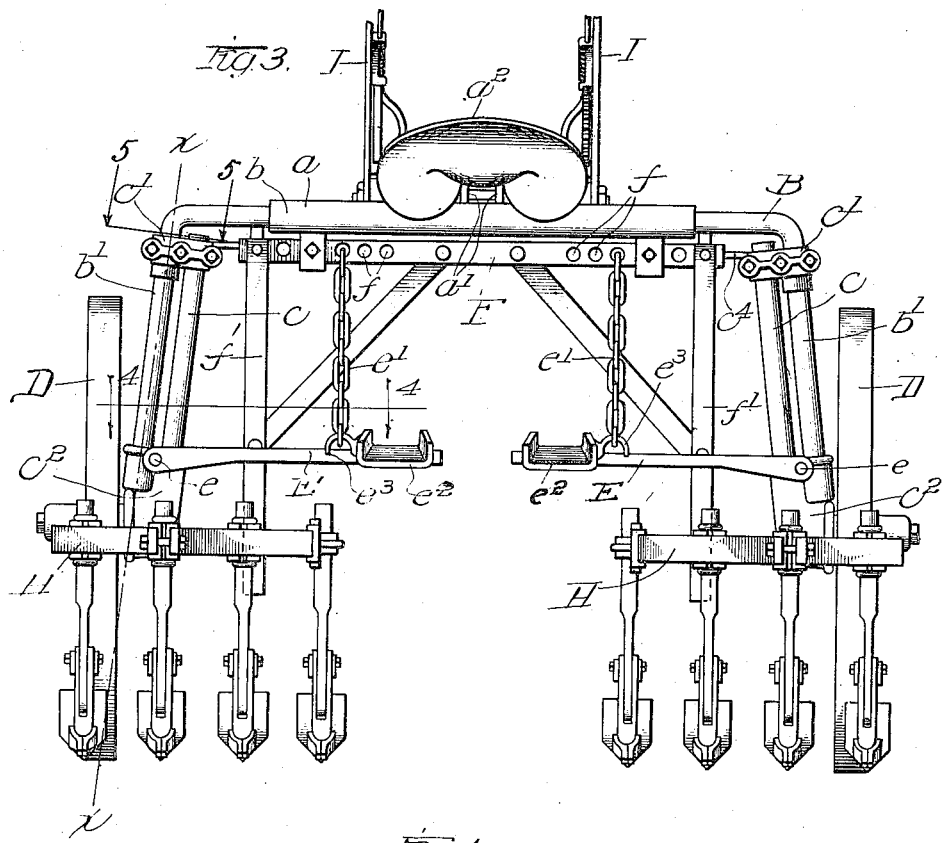
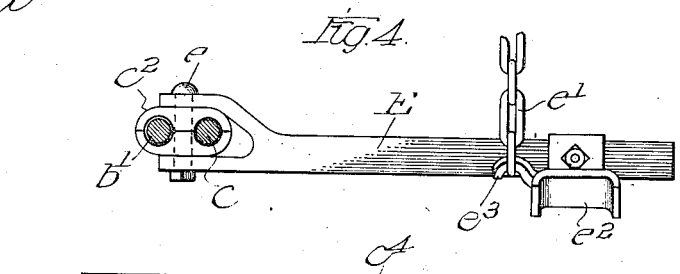
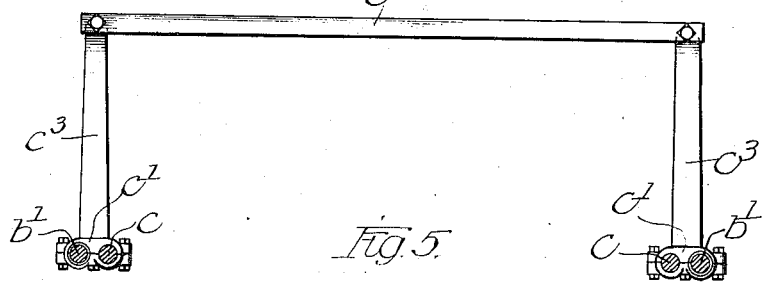

UNITED STATES PATENT OFFICE.

ALVARO S. KROTZ, OF JANESVILLE, WISCONSIN, ASSIGNOR TO THE JANESVILLE MACHINE COMPANY, OF JANESVILLE, WISCONSIN, A CORPORATION OF WISCONSIN.

CULTIVATOR OR OTHER VEHICLE HAVING MANUALLY-CONTROLLED STEERING-WHEELS.

1,162,077.  Specification of Letters Patent.  Patented Nov. 30, 1915.

Application filed May 31, 1913. Serial No. 770,878.

*To all whom it may concern:*

Be it known that I, ALVARO S. KROTZ, a citizen of the United States of America, and resident of Janesville, Rock county, Wisconsin, have invented a certain new and useful Improvement in Cultivators or other Vehicles Having Manually-Controlled Steering-Wheels, of which the following is a specification.

My invention relates to wheeled vehicles in general, but more particularly to that kind in which the steering wheels are mounted for angular adjustment about separate axes, in steering the vehicle, and especially those in which the pivoted spindles of the wheels are provided with foot levers, as in riding cultivators, whereby the wheels are turned to the right or left at the will of the driver.

Generally stated, the object of my invention is to provide a vehicle or machine having novel and highly efficient steering mechanism of the foregoing general character.

A special object is to provide a cultivator or other vehicle having an improved steering gear in which the vertically disposed axes thereof, about which the wheels are swung or given angular adjustment for steering purposes, extend downwardly through the treads of the wheels, preferably at or near the center of each wheel tread, or somewhere outside of the inner edges of said treads, and in some cases, if desired, immediately inside of said inner edges, for the purpose of preventing wabbling and jerking of the wheels from side to side, in passing over rough or soft ground, or when one wheel alone encounters an obstruction.

Another object is to provide a cultivator or other vehicle of this character in which the foot levers by which the wheels are angled or governed for steering purposes have their inner or distal ends supported to move downward, when the levers are pushed forward from normal position, whereby the strength of the operator is exerted to a greater advantage, as the desired forward throw of the lever is produced not only by muscular effort, but also, and very largely, by the mere weight of the operator.

It is also an object to provide certain details and features of construction tending to improve the general efficiency of a cultivator or other vehicle of this particular character.

To the foregoing and other useful ends, my invention consists in matters hereinafter set forth and claimed.

In the accompanying drawings, Figure 1, is a longitudinal section of a wheeled or riding cultivator embodying the principles of my invention. Fig. 2, is an enlarged detail view of one of the wheel spindles, and the downturned end portion of the axle, showing adjacent portions in section. Fig. 3, is a rear elevation of the cultivator shown in Fig. 1. Fig. 4 is an enlarged detail section on line 4—4 in Fig. 3. Fig. 5 is a detail section on line 5—5 in Fig. 1, showing the connection whereby the two wheels are maintained in parallel relation to each other.

As thus illustrated, a cultivator constructed in accordance with my invention comprises a tongue A suitably secured to the tube or hollow axle bar $a$, and provided with rearwardly extending seat bars $a^1$ to which is secured the seat $a^2$, the axles B are inserted in the ends of the tube $a$, being adjustably held therein by set screws $b$, and are provided with down-turned end portions $b^1$, which latter incline inwardly at their upper ends. The wheel spindles C have upturned portions $c$ disposed inside of the axle portions $b^1$, parallel therewith, and are provided with upper and lower brackets $c^1$ and $c^2$. These brackets are each composed of two parts held together by bolts, whereby said brackets are clamped tightly upon the portions $c$ of the spindles. It will be seen that the upper and lower portions of the spindle form an obtuse angle between them. The axle portions $b^1$ extend through the bracket $c^1$ and into the brackets $c^2$ in such manner that each bracket is free to turn thereon, whereby each spindle is pivoted to swing about an axis provided by the adjacent axle portion $b^1$. Thus the axle structure is in the form of an arch with a pivoted spindle at each end thereof. The wheels D are of any suitable character and are mounted upon the spindles C, having their hubs $d$ held against displacement from the spindles by the brackets $c^2$, whereby said wheels travel on the ground and support the body frame of the cultivator. The axles are provided with collars $b^2$ that bear against the under sides of the brackets $c^1$ to prevent the spindles from becoming detached from the axles. The brackets $c^1$ have forwardly extending arms $c^3$ that are connected together by a link or bar $c^4$, whereby said wheels are always parallel. With this construction the wheels can be skewed or angled relative to the cultivator frame, thus permitting the cultivator to be steered or guided to either side. As the axle portions $b^1$ are inclined away from the tops of the wheels, at certain angles, the axes about which the wheels are moved or adjusted extend downwardly through the treads of the wheels, preferably at or near the center of each said wheel tread, as shown by line $x$—$x$ in Fig. 3. Each wheel hub and bearing is directly over the tread of the wheel, and thereby directly in line vertically with the point at which the axis of adjustment intersects the tread. In this way the wheels have no tendency to wabble or jerk from side to side in traveling over rough or soft ground, or when one wheel alone rides over an obstruction.

The foot levers E are pivoted on the brackets $c^2$, by bolts $e$, whereby each lever is adapted to swing up and down about a horizontal axis. These levers or steering arms E are movable about said axes of movement of the spindles, and as these axes are inclined the said levers would, if fixed to the spindles, and like the steering arms $c^3$, move up and down when operated to control the wheels; and with the pivots $e$ this up and down motion may be rendered greater, as follows: The inner or distal ends of said levers are supported by depending chains $e^1$, whereby the levers may be moved forward and back, and are also provided with adjustable foot pieces $e^2$, the latter being slidable back and forth on said levers and having any suitable means for securing them in adjusted position thereon. It will be seen that normally the chains extend downward and rearward, whereby the foot pieces $e^2$ move downward and forward on the lines of circles struck from the upper ends of said chains, the movement of each foot piece being in a direction approximately at an angle of forty five degrees, which is the most convenient for the person occupying the seat $a^2$. In other words, this enables the operator to utilize weight as well as muscular exertion, and to move the levers forward by merely throwing the weight of the body thereon. The upper ends of the chains $e^1$ can be hooked up or let down, by hooking into different links thereof, and in this way the foot pieces $e^2$ can be raised or lowered to suit the convenience of the driver. The lower ends of these chains are preferably attached to hooks $e^3$ on the foot pieces, and the frame bar F is provided with holes $f$ for the upper ends of the chains, or for the attaching devices thereof, whereby the distance between said chains can be varied when the foot pieces are moved toward or away from each other. The downward flaring apart of the axles $b^1$ tends to increase the length of the levers E, and to thereby give the operator the benefit of a greater leverage in operating the wheels for steering purposes.

The draft arch G is supported as usual on the tongue A, and is braced by rods $g$ which extend rearwardly to the axles. The cultivator gangs H may be of any suitable, known or approved construction, and are connected with the lower ends of said arch, the draft devices (not shown) being of any suitable form and connected with the eyes $h$ at lower ends of the arch. The bar F is provided with the downwardly extending arms $f^1$, or so called pendulums, which engage the cultivator gangs to keep them properly spaced. As shown, the gangs are raised and lowered by the usual hand levers I, the latter being pivoted on the frame, and having bell crank arms $i$ connected by rods $l^1$ with the gangs, in any suitable manner.

From the foregoing it will be seen that by my invention I provide a vehicle, for example, an agricultural implement, but not necessarily of any particular character, wherein the construction is such that the axes of angular adjustment of the wheels, for steering purposes, extend downward through the treads of the wheels, or at least outside of the inner edges thereof, whereby the difficulty heretofore experienced with steering wheels of this kind, when the said axes were disposed more or less inside of the wheel treads, is entirely obviated, as the ground pressure on the wheels is balanced, so to speak, being the same at opposite sides of said axes. Moreover, the foot levers for steering or guiding the vehicle, by angular adjustment of said wheels, are so mounted that the operator can easily control the wheels, each lever having a downward motion at its distal end, when pushed forward, as well as movement about the said axis of adjustment of the allotted wheel. Again, the steering gear thus provided is easily and conveniently adjusted or regulated to suit the convenience and ideas of different drivers.

With the construction shown and described, the two axes of adjustment of the wheels can be shifted bodily toward and away from each other, and can also be shifted about a horizontal axis extending transversely of the machine, by loosening the set screws $b$, whereby the distance between the wheels may be varied at will, and whereby the wheels may be shifted forward or backward to suit the requirements.

It will also be seen that the foot levers E are each adapted to move about two axes formed by the axle and the pivot, and are each adapted to have movement about a third axis located at the upper end of the supporting chain. Thus each lever, while moving forward, has motion about three axes, as stated, one of which is approximately vertical, and the other two of which axes are horizontal; and, as shown and described, one of the three axes is shifting in character, being formed by the pivot at the outer end of the lever, while the other two are fixed.

As the axis of adjustment of the steering wheel is disposed at an oblique angle to the axis of rotation of said wheel, it follows that said first mentioned axis, which is the one about which the wheel swings for steering purposes, extends downward in a direction to somewhere intersect and pass through the vertical plane in which the wheel rotates.

As explained, I do not limit myself to any particular angle between the two axes, as this may vary more or less, if desired, and so as to cause the said vertically disposed axis of adjustment to intersect the said plane of rotation, either closer to or farther away from the axis about which the wheel rotates, as the case may be, and depending on the form or size of the wheel, without in any way departing from the spirit of my invention.

With further reference to the steering axes of the wheels, it will be seen that each axis passes through the ground contact point of the wheel—that is to say, the axis is coincident, or substantially so, with the point where the wheel rests on the ground, notwithstanding the fact that the wheels rotate about horizontal axes. Thus each wheel rotates in a vertical plane, and the ground contact point of each wheel is in the plane of the steering axis of the wheel, this common plane being vertical when the vehicle is horizontal. With this arrangement the wheels are very easily controlled by the feet of the rider, notwithstanding the inclined steering axes of the wheel spindles, and the jerking and wabbling heretofore experienced with various cultivators and similar vehicles of this kind is very greatly overcome. The steering axes do not reach the ground in front of or behind the ground contact points of the wheel, but rather in the plane of the latter, as stated, and at points preferably in the vertical plane which is common to said steering axes and also the axes of rotation of the wheels when the vehicle is traveling straight ahead.

With further respect to the combination of the pivoted steering levers E and the inclined steering axes of the wheels, it will be seen that the pivots $e$ enable the foot pieces $e^2$ on the adjacent ends of said levers to have a downward movement when they are moved forward, whereby said foot pieces practically swing downward and forward about a horizontal axis above. If the said levers were rigid with the socket castings $c^2$, then the foot pieces $e^2$ would begin to move upward as soon as they started to move forward from normal position; but by means of the pivots $e$ and the chains $e^1$, and regardless of the angle or inclination of the steering axes, the said foot pieces $e^2$ have a substantial downward movement when moved forward from normal position. The foot pieces $e^2$ are properly described as such for the reason, it will be seen, that the seat $a^2$ is so arranged that these elements $e^2$ may be conveniently engaged by the feet of the rider, and the relative arrangement is such that the mere throwing of the weight on either foot piece serves to move the latter forward. This is for the reason that the chains $e^1$ are normally swung to a rearward position, as shown in Fig. 1, whereby any weight imposed on the lever and foot piece will naturally cause the same to seek a position at a point forward where the chain will hang vertically, as the weight naturally seeks the lowest position it can find. This, as will be readily understood, results in a steering mechanism which is very easily and conveniently controlled, and with the seat $a^2$ in proper position this control is exercised by the feet of the rider on the elements $e^2$, in the manner explained.

What I claim as my invention is:

1. A vehicle provided with steering wheels, a spindle for each said wheel, and means whereby said spindles are movable about axes extending downward outside of the inner edges of the treads of said wheels, each said spindle having upper and lower portions forming an obtuse angle between them, and said axes being disposed parallel with and outside of said upper portions, whereby each upper portion has bodily motion inside of and about one of said axes.

2. A vehicle provided with steering wheels, a spindle for each said wheel, and means whereby said spindles are movable about axes extending downward outside of the inner edges of the treads of said wheels, an axle having down turned end portions forming said axes, disposed at an angle to each other, and means adapted to oscillate on said end portions of the axle, fixed on said spindles at points inside of said end portions of the axle, said means including sockets for the lower ends of said axle portions, and steering mechanism connected to said means.

3. A vehicle provided with steering wheels, a spindle for each said wheel, a support having means whereby said spindles are movable about upright axes, foot levers for operating said spindles, swiveled castings pivotally connecting said levers with said spindles, a seat above and in rear of said levers, means for supporting said levers, and means for keeping said wheels parallel.

4. A vehicle provided with a steering wheel, a spindle for said wheel, and means whereby said spindle is movable about an axis extending downwardly through the tread of said wheel, said spindle having an upturned portion disposed parallel with said axis, an axle having a down turned portion forming said axis, disposed between the wheel and said upturned portion of the spindle, and means arranged to oscillate on said down turned portion of the axle, fixed on said upturned portion of the spindle.

5. A vehicle provided with a steering wheel, a pivoted spindle for said wheel, a support for said spindle, a foot lever for operating said spindle, movable therewith about the pivotal axis thereof, serving thereby to direct the course of the vehicle, and means whereby the distal end of said lever moves up and down during the back and forth operation thereof.

6. A vehicle provided with a steering wheel, a pivoted spindle for said wheel, a support for said spindle, a foot lever for operating said spindle, serving thereby to direct the course of the vehicle, and means whereby the distal end of said lever moves up and down during the back and forth operation thereof, said means including a pivotal connection between said lever and spindle, providing a horizontally disposed axis about which the lever moves up and down, and a swinging support to the lower end of which said lever is secured, arranged to swing downward when the lever is moved forward.

7. A vehicle provided with a steering wheel, a pivoted spindle for said wheel, a support for said spindle, a foot lever for operating said spindle, serving thereby to direct the course of the vehicle, and means whereby the distal end of said lever moves up and down during the back and forth operation thereof, said means including a pivotal connection between the said lever and spindle, a swinging support for said lever, whereby the distal end of the lever moves about three axes when operated, and means for adjusting said support to vary the horizontal position of said lever.

8. A vehicle provided with a steering wheel, a pivoted spindle for said wheel, a support for said spindle, a foot lever pivoted on said spindle, serving thereby to direct the course of the vehicle, and means for supporting the distal end of said lever.

9. A vehicle provided with a steering wheel, a pivoted spindle for said wheel, a foot lever pivoted on said spindle, serving thereby to direct the course of the vehicle, and means for supporting the distal end of said lever, another wheel of similar character, having a spindle and foot lever, the two levers extending toward each other, means for connecting said spindles together to keep said wheels parallel, and a support for each spindle.

10. A vehicle provided with a steering wheel, a pivoted spindle for said wheel, a foot lever pivoted on said spindle, means for supporting the distal end of said lever, another wheel of similar character, having a spindle and foot lever, the two levers extending toward each other, means for connecting said spindles together to keep said wheels parallel, an arch providing axes for the oscillation of said spindles, said levers being movable forward and downward about said axes, and a seat disposed in rear of said arch to enable the occupant thereof to conveniently operate said levers by downward foot pressure thereon.

11. A vehicle provided with steering wheels, a spindle for each said wheel, and means whereby said spindles are movable about axes extending downward inside of the outer edges of the treads of said wheels, each said spindle having integral upper and lower portions forming an obtuse angle between them and said axes being disposed parallel with and outside of said upper portions, the latter thereby each movable bodily about one of said axes.

12. A vehicle provided with steering wheels, a spindle for each said wheel, and means whereby said spindles are movable about axes extending downward inside of the outer edges of the treads of said wheels, an axle having down turned end portions forming said axes, said end portions being disposed between the wheels and spindles, and means arranged to oscillate on said end portions of the axle, fixed on said spindles.

13. A vehicle provided with a steering wheel, a spindle for said wheel, and means whereby said spindle is movable about an axis extending downwardly through the plane of rotation of said wheel, said spindle having an upturned portion disposed parallel with said axis, an axle having a down turned portion forming said axis, disposed between the wheel and said upturned portion of the spindle, and means arranged to oscillate on said down turned portion of the axle, fixed on said upturned portion of the spindle.

14. A vehicle having steering wheels, steering levers for controlling said wheels, foot pieces for the adjacent ends of said levers, pivots for the other ends of said levers, hooks on said foot pieces, chains having links for engaging said hooks, and a support for said chains.

15. A vehicle having steering wheels, steering levers for controlling said wheels, foot pieces for the adjacent ends of said levers, pivots for the other ends of said levers, hooks on said foot pieces, chains having links for engaging said hooks, and a support for said chains, said support having means for adjusting said chains toward and away from each other.

16. A vehicle having steering wheels, steering levers for controlling said wheels, foot pieces for the adjacent ends of said levers, pivots for the other ends of said levers, hooks on said foot pieces, chains having links for engaging said hooks, and a support for said chains, said pieces being adjustable toward and away from each other on said levers, and said support having a plurality of attaching points for said chains.

17. A vehicle having steering wheels, steering levers having foot pieces, and supports for said levers having means to raise and lower the foot piece ends thereof only.

18. A vehicle having steering wheels, means providing inclined steering axes for said wheels, steering foot levers arranged to control said wheels, and instrumentalities coöperating to practically prevent the inclination of said axes from influencing the back and forth swing of said levers, said instrumentalities including swinging supports for said levers.

19. A vehicle having steering wheels, means providing inclined steering axes for said wheels, steering foot levers arranged to control said wheels, and instrumentalities coöperating to practically prevent the inclination of said axes from influencing the back and forth swing of said levers, said instrumentalities including horizontal pivots for the outer ends of said levers.

20. A vehicle comprising a pair of steering wheels having swiveled wheel spindles forming swinging axles for the wheels, and steering mechanism operable by direct downward pressure on one or the other of two elements thereof for turning said spindles and wheels in either direction, said mechanism including a pair of inclined members, one for supporting each said element, arranged to swing forward under weight or downward pressure on said elements.

21. A vehicle provided with steering wheels, a spindle for each said wheel, means including upper and lower swivel bearings disposed above the axis of rotation of said wheels and whereby said spindles are movable about steering axes extending downward outside of the inner edges of the treads of said wheels, said bearing having means inside of said axes to clamp the spindles, said axes extending upward inside of said edges, and devices for controlling the motion of said spindles and movable therewith about said axes, the ground contact points of said treads being located in the plane of said axes when the vehicle is traveling on a level surface.

22. A vehicle provided with steering wheels, a spindle for each said wheel, means including upper and lower swivel bearings disposed above the axis of rotation of said wheels and whereby said spindles are movable about steering axes extending downward outside of the inner edges of the treads of said wheels, said spindles having upturned portions to which said bearings are clamped, said axes extending upward inside of said edges, each steering axis passing through the tread of its allotted wheel approximately at the center thereof, and devices for controlling the motion of said spindles and movable therewith about said axes, the ground contact points of said treads being located in the plane of said axes when the vehicle is traveling on a level surface.

23. A vehicle provided with steering wheels, a spindle for each said wheel, and swivel means whereby said spindles are movable about steering axes extending downward outside of the inner edges of the treads of said wheels, said axes extending upwardly inside of said wheel edges, said spindles being disposed at angles permitting said wheels to rotate about a horizontal axis entirely below said swivel means, and foot levers pivoted on said means to steer the vehicle.

24. A vehicle provided with a steering wheel, a spindle for said wheel, whereon the wheel rotates, providing a bearing disposed directly above the ground contact point on the tread of the wheel, means disposed entirely above the axis of rotation of said wheel and whereby said spindle is movable about a steering axis extending downwardly adjacent the tread of said wheel, substantially in the vertical and transverse plane of said point, said steering axis extending upwardly at one side of said tread, being disposed at an oblique angle to the axis of said wheel, and a foot operated steering device pivoted on said means.

25. A vehicle provided with a steering wheel, a spindle for said wheel, means whereby said spindle is movable about a steering axis extending downwardly through the tread of said wheel, said axis being inclined away from the top of the wheel, the plane of said tread being vertical, and a steering device attached to said means, said device being movable forward and downward about said axis, and means to permit said downward movement of said device.

26. A vehicle provided with steering wheels, a spindle for each said wheel, means wholly external of said wheels and entirely above the axis of rotation thereof and whereby said spindles are movable about steering axes extending downward inside of the outer edges of the treads of said wheels, said axes converging upwardly inside of said wheels, elements entirely above said means and arranged for holding said axes in fixed angular relation to each other, and steering arms mounted on said means and movable about said axes to control said wheels, said arms being above said axis.

27. A vehicle provided with a steering wheel, a spindle for said wheel, whereon the wheel rotates, providing a bearing disposed directly above the tread of the wheel, means including upper and lower movable swivel bearings disposed above the axis of rotation of said wheel and whereby said spindle is movable about an inclined steering axis extending downwardly through the plane of rotation of said wheel, said axis extending upwardly at one side of said tread, being disposed at an oblique angle to the plane of said wheel, and a steering arm connected with said spindle and movable up and down and about said steering axis when operated to guide the wheel, said steering axis being formed by a straight member which extends downward through said upper bearing and terminates in said lower bearing.

28. A vehicle provided with a steering wheel, a spindle for said wheel, means including upper and lower swivel bearings whereby said spindle is movable about an inclined steering axis extending downwardly through the plane of rotation of said wheel, and a steering arm movable up and down and about said axis to guide the wheel, said axis being inclined away from the top of the wheel, and the plane of said wheel being vertical, said steering axis being formed by a straight member which extends downward through said upper bearing and terminates in said lower bearing.

29. A vehicle having steering wheels, steering axes for said wheels, steering levers, one for each wheel, movable in opposite directions about said axes to turn both wheels in the same direction, and adjustable means for supporting and adjusting said levers up and down to suit the convenience of the operator.

30. A vehicle having steering wheels, means providing inclined steering axes for said wheels, steering foot levers movable about said axes and arranged to control said wheels, and instrumentalities for supporting the foot levers and to cause relative motion thereof in addition to the movement afforded by said axes.

31. A vehicle comprising, in combination, a frame having steering wheels, and steering mechanism for controlling said wheels, said mechanism including swinging supports hung in said frame and a foot piece for the lower end of each support, and separate means to operatively connect said foot pieces with said wheels.

32. A vehicle comprising a pair of steering wheels having swiveled wheel spindles forming swinging axles for the wheels, providing steering axes for the wheels, and steering mechanism operable by direct downward pressure on one or the other of two elements thereof for turning said spindles and wheels in either direction, said elements being adjacent and movable about said axes relative to each other.

33. A vehicle comprising a pair of steering wheels having swiveled wheel spindles forming swinging axles for the wheels, and steering mechanism operable by direct downward pressure on one or the other of two elements thereof for turning said spindles and wheels in either direction, said swivels providing inclined steering axes which intersect the vertical planes of the wheels at points adjacent the ground contact points thereof, and said elements being movable back and forth about said inclined steering axes.

34. A vehicle comprising steering wheels, wheel-spindles having up-turned portions, upper and lower swivel bearings secured on said portions, pivot members extending downward through said upper bearings and terminating in the lower hinges, forming steering axes for said spindles and wheels, and steering mechanism applied to said spindles.

35. A vehicle comprising steering wheels, wheel-spindles having up-turned portions, upper and lower swivel bearings secured on said portions, pivot members extending downward through said upper bearings and terminating in the lower hinges, forming steering axes for said spindles and wheels, and steering mechanism applied to said spindles, said up-turned portions being disposed inside of said pivot members.

36. A vehicle comprising steering wheels, wheel-spindles having up-turned portions, upper and lower swivel bearings secured on said portions, pivot members extending downward through said upper bearings and terminating in the lower hinges, forming steering axes for said spindles and wheels, and steering mechanism applied to said spindles, said mechanism including foot levers pivoted on said bearings.

Signed by me this 13th day of May, 1913.

ALVARO S. KROTZ.

Witnesses:
 Geo. H. Drummond,
 Roxie Johnston.